Patented Nov. 6, 1951

2,573,769

UNITED STATES PATENT OFFICE 2,573,769

HERBICIDE

Joseph A. Lambrech, South Charleston, W. Va., assignor, by mesne assignments, to Union Carbide and Carbon Corporation, a corporation of New York No Drawing. Application January 4, 1949, Serial No. 69,245

10 Claims. (Cl. 71—2.6)

This invention relates to chemical products at least certain of which have been found to be of value for the so-called "pre-emergence" treatment of fields to inhibit the emergence of weeds, yet have substantially no effect on the crop in the treated field or in adjoining fields which are not specifically treated. The beneficial action of the materials in inhibiting weeds appears to depend upon the relation of two factors, (1) the chemical constitution of the material, and (2) the distinction between the germination characteristics of weed seeds and the seeds of certain crops.

The undesirability of a mixed growth of weed plants and crop plants is universally acknowledged. It is possible to remove the weed plants by manual labor either with or without the assistance of mechanical devices as horse or tractor-drawn cultivators. Lately, it has been found that certain chemicals with powerful hormonal action will adversely affect certain plants in foliage, notably broad-leaved plants, and not affect so adversely narrow-leaved plants. Difficulty in the use of these chemicals arises, however, where a field of broad-leaved crop plants is in foliage next to a treated field, as the hormonal chemicals are carried by the wind to the broad-leaved crop plants and adversely affect the desirable crop plants. The herbicide familiarly known as "2,4-D" (2,4-dichlorophenoxy acetic acid) and its salts or esters are difficulty to control.

It is now found that if certain chemicals, notably the first ten listed on the following Table 1, are properly applied to the surface of the ground, the growth of the majority of weeds in the treated area can be inhibited yet the growth of the seeds of crops which are planted relatively deeply is not adversely affected and the plant life of adjacent areas is substantially unaffected. This allows a field to be fitted, then planted with corn, snap beans, lima beans or like crop whose seeds are planted one inch or more below the surface, and then chemically treated with the assurance of a low weed count and at least a normal crop from the crop seeds.

The chemicals which are found to give this result are represented by sodium 2-(2,4-dichlorophenoxy)ethyl sulfate having the structural formula

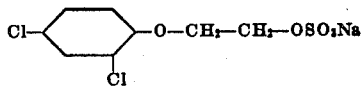

Materials which have been found to be operative for this purpose corespond to the general formula

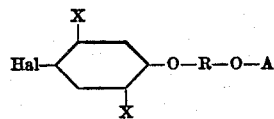

where
"Hal" is either chlorine or bromine,
"X" is either hydrogen, chlorine or bromine,
"R" is an ethylene group or an ethylene ether group, for instance

"A" is the neutralized acid residue of a polybasic mineral acid, for instance —O—A is the sulfate residue —O—SO₃—Y or the phosphate residue —O—PO₃=Yn where Y is an alkali metal (as Na or K) or an alkaline earth (as Ca, Mg or Ba) or an ammonium group or an amine (as morpholine or a methanol or ethanol amine, for instance triethanol amine or similar material of lower molecular weight) and "n" is either 1 or 2 depending upon the valence of the neutralizing metal or group and the basicity of the acid.

Where the acid is dibasic and Y has two valences, for instance in the case of sulfuric acid and calcium, the acid residue may be of the formula

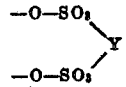

The chemicals contemplated herein as desirable herbicides have such a low hormonal value that they may be applied to the ground as sprays or dusts of such effective concentrations that they prevent the growth of a large proportion of the weed seeds but the drifting spray or dust which may deposit upon the parts of plants above the ground has substantially no effect upon the emerged plants. For this reason, treatment of one field does not affect another field nor the plants growing in this other field. Thus, a corn field or bean field may be plowed, planted and treated with the herbicidal chemicals contemplated herein and weeds will be inhibited to a large extent yet the drifting spray or dust of these chemicals does not kill growing plants in an adjoining field.

It is believed that the toxicants act in the following manner upon seeds which germinate under different conditions. The seeds of the majority of weeds germinate at a depth no greater than one-half inch below the surface of the ground. Seeds of such weeds which are buried deeper than one-half inch generally do not germinate. On the other hand, the seeds of many crop plants, for instance corn, snap beans, and lima beans are planted deeper than one-half inch, usually one inch or more below the surface. When a field is plowed prior to planting a crop, the surface layer of earth is turned under and growing weeds as well as those weed seeds which were on or near the surface are buried. The crop seeds should be planted as soon as possible after plowing. Weeds which ordinarily appear in untreated fields, sprout from seeds blown onto or otherwise deposited on the field after fitting of the land or from seeds buried in previous plowings and brought near the surface by the last plowing. The best time to apply the chemicals contemplated herein is after the crop seed has been planted and preferably after the seed coat of the crop seed has split and the root has appeared. The chemicals may be applied to the surface of the ground during the period from four hours to three days after the crop seeds are planted. The toxicants should not be worked into the earth. The selective action of the chemicals appears to be that the toxicant, in proper concentration, kills the germinating seed as well as the young root in the early stages of development, that is up to the point where the shoot is about one-half inch or less in length but not in the later stages of development when the plant is more hardy. When the plant has developed to the point where the shoot is over three-quarters of an inch in length, the root is so long and has grown so far away from the toxicant that the plant is hardy enough to resist being killed by the toxicant. Thus when the proper amount of chemical is applied to the ground, it is most concentrated within the top one-quarter to one-half inch of earth; and sprouted weed seeds are killed as well as weed seeds which are in the early germination period. However, the larger crop seeds are usually planted one inch or more below the surface of the earth; the toxicant does not reach these seeds in sufficient concentration to kill the seed, and by the time that the stem has reached a point about one-half inch below the surface of the earth, the plant is hardy enough to resist the toxicant sufficiently that it does not affect the crop plant. Seeds which are shallow planted, for instance seeds of radish, lettuce and the like, are killed like weed seeds. All seeds are most vulnerable to these chemicals during the imbibition period, during which time the seeds per se are absorbing moisture, as distinguished from the absorption of moisture by the plant through the root after the imbibition period.

The chemicals may be applied at the rate of from 0.5 to 5 pounds per acre, preferably in water solution. Sprays containing from 2 to 4 pounds of the chemical per 100 gallons (834 pounds) of water are satisfactory for general use, the more concentrated solution preferably being applied at the rate of 50 gallons per acre where the earth is at "field capacity" and the less concentrated solution being applied at the rate of 150 gallons where the surface of the earth is dry to a depth of about one-quarter of an inch, but not dusty (dry soil). The term "field capacity" is used to denote that moisture condition where the earth has been saturated with water but the water has drained away, for instance the condition of the earth after a continuous rain has ceased and water from puddles has disappeared into the ground. At field capacity the soil contains about 30% to 40% of its weight (oven dry at 100° C.) as water, the higher percentage being found in earth with small absorbent particles for instance as found in good loam with a high organic content, and the lower percentage being found in sandy earth. With the earth at field capacity, the amount of chemical applied is preferably about 1.5 pounds per acre and in dry soil about 3 pounds per acre. Under average conditions, sprays containing from 2 to 3 pounds of the chemical per 100 gallons of water (this amount of spray being applied per acre) keeps down the weeds in a satisfactory manner, 3 pounds per 100 gallons giving excellent results consistent with low cost.

In testing the materials in the following table, flats about 10 x 13 inches (0.90 square foot) were filled to a depth of 3 inches with soil, saturated with water and then allowed to drain. This amount of water is called the "field capacity." With the soil at field capacity, 10 grains of corn and 10 snap beans were planted at a depth of about 2 inches. Three days later, 30 turnip seeds were planted at depths between one-quarter and one-half inch and the soil was again saturated. About six hours after planting the turnip seeds, one flat was sprayed with a solution of one of each of the chemicals; three flats were unsprayed as checks. The crop seeds, corn and beans, were planted in evenly spaced rows about 4 inches apart. The turnip seeds were planted between the two crop-seed rows. Turnip seeds were planted to simulate weeds as they germinate best at a depth of one-quarter to one-half inch, the same as weeds. Also when planted in "field capacity" soil about three days after crop seeds and allowed to imbibe for six hours, the plants appear at the surface of the soil at approximately the same time as the average weed appears relative to the advancement of the crop plant. The solutions used contained the chemicals in the proportion of 3 pounds of the chemical per 300 gallons of water and were sprayed on the soil in the proportion of 3 pounds of the chemical per acre. Counts of plants visible above the soil six days after spraying showed that all of the crop seeds germinated. The number of visible turnip plants in the flats treated with the respective chemicals is shown in the column of figures at the right in the following Table 1, opposite to the name of the chemical.

Table 1

| | | Number of Visible Turnip Plants |
|---|---|---|
| 1 | Sodium 2-(2,4-dichlorophenoxy)ethyl sulfate | 2 |
| 2 | Sodium 2-(2,4,5-trichlorophenoxy)ethyl sulfate | 4 |
| 3 | Sodium 2-(4-chlorophenoxy)ethyl sulfate | 0 |
| 4 | Morpholine 2-(2,4-dichlorophenoxy)ethyl sulfate | 0 |
| 5 | Ammonium 2-(2,4-dichlorophenoxy)ethyl sulfate | 1 |
| 6 | Disodium 2-(2,4-dichlorophenoxy)ethyl phosphate | 1 |
| 7 | Sodium 2-(2-(2,4-dichlorophenoxy)ethoxy)ethyl sulfate | 1 |
| 8 | Calcium 2-(2,4-dichlorophenoxy)ethyl sulfate | 8 |
| 9 | Triethanolamine 2-(2,4-dichlorophenoxy)ethyl sulfate | 10 |
| 10 | Sodium 2-(2,4-dibromophenoxy)ethyl sulfate | 6 |
| 11 | Sodium 2-(2-chloro-4-dodecylphenoxy)ethyl sulfate | 30 |
| 12 | Sodium 2-(4-chloro-3,5-dimethylphenoxy)ethyl sulfate | 30 |
| 13 | Sodium 1-(2,4-dichlorophenoxy)-2-propyl sulfate | 17 |
| 14 | Sodium 2-(2-chlorophenoxy)ethyl sulfate | 16 |
| 15 | Sodium 2-(phenoxy)ethyl sulfate | 30 |
| 16 | Sodium 2-(cresoxy)ethyl sulfate | 21 |
| 17 | Disodium p,p'-isopropylidene-bis(2-(2,6-dichlorophenoxy))ethyl sulfate | 30 |
| 18 | Sodium 2-(alphanaphthoxy)ethyl sulfate | 28 |
| 19 | Sodium 2-(pentachlorophenoxy)ethyl sulfate | 30 |
| 20 | Sodium 2-(2,4,6-trichlorophenoxy)ethyl sulfate | 17 |
| 21 | Disodium 1,1'-(p,p'-sulfodiphenoxy-2,2'-diethyl) disulfate | 27 |
| 22 | 2,4-D-Na (the sodium salt of 2,4-D) | 0 |

This test was continued by giving each flat a second spray of the same solution and at the same rate as was originally sprayed. The second spray was given twelve days after the first spray. At the time of the second spray the corn plants were about 20 cm. high and the bean plants about 26 cm. high. Such turnip plants as were growing in the test flats were about 6 cm. high. The plants as well as the earth received the second spray and nine days after the second spray all bean plants receiving the 2,4-D-Na spray were dying but none of the plants receiving the other sprays indicated on Table 1 showed any signs of being affected adversely by the sprays.

Greenhouse tests were made on tomato plants with certain of the chemicals disclosed herein, representing the situation where tomatoes are growing in a field adjacent to a field treated with aqueous sprays containing the chemicals and enough spray is blown on the tomatoes thoroughly to wet the tomato plants. Tomato was chosen as the test plant because it is frequently grown adjacent to stands of corn, beans, and the like. In making the tests, aqueous solutions of the various chemicals at the concentrations given in the following Table 2 were prepared and sprayed upon tomato plants until the plants were thoroughly wet. The plants were then placed in a greenhouse together with unsprayed check plants. In Part 1, the response ratings were made two days after spraying and measurements of plant heights were made eleven days after spraying. In Part 2, ratings and measurements were made twenty-one days after spraying.

*Table 2*

| Chemical, Per cent by weight in water | Hormone Response (Epinasty) Plant No. | | Height Increment in centimeters | | | Per Cent of Check |
|---|---|---|---|---|---|---|
| | | | Plant No. | | Average | |
| | 1 | 2 | 1 | 2 | | |
| PART 1 | | | | | | |
| No. 1: | | | | | | |
| 0.1 | A | A | 13 | 12 | 12.5 | 93 |
| 0.01 | A | A | 12 | 18 | 15.0 | 111 |
| 0.001 | A | A | 16 | 16 | 16.0 | 118 |
| Na salt of 2,4-D: | | | | | | |
| 0.1 | C | C | 0 | 1 | 0.5 | 4 |
| 0.01 | C | C | 3 | 5 | 4.0 | 30 |
| 0.001 | C | C | 11 | 6 | 8.5 | 63 |
| Check No. 1 | A | A | 14 | | | |
| Check No. 2 | A | A | 14 | | | |
| Check No. 3 | A | A | 14 | | | |
| Check No. 4 | A | A | 12 | | | |
| Check No. 5 | A | A | 13 | | | |
| Check No. 6 | A | A | 14 | | 13.5 | 100 |
| PART 2 | | | | | | |
| No. 2: | | | | | | |
| 0.1 | A | A- | 15 | 16 | 15.5 | 65 |
| 0.01 | A | A | 32 | 26 | 29.0 | 121 |
| 0.001 | A | A | 38 | 36 | 37.0 | 154 |
| Na salt of 2,4-D: | | | | | | |
| 0.1 | C | C | ¹7 | ¹9 | 8.0 | 33 |
| 0.01 | C | C | ¹9 | ¹10 | 9.5 | 40 |
| 0.001 | B | B | 23 | 24 | 28.5 | 120 |
| Check | A | | 24 | | | |

¹ Indicates plant dead at time of reading.
A indicates no effect.
B indicates slight to moderate epinasty.
C indicates severe epinasty.
Height increment is the number of centimeters the plant increased in height between the time of spraying and 11 days later for Part 1 data and 21 days later for Part 2 data.

In field tests on the typical material No. 1, in comparison with the chemical known generally as the sodium salt of 2,4-D, plots of earth in the vicinity of Yonkers, New York, 50 square feet in size, were fitted by plowing and double discing in the manner usual in preparing land for planting a crop. No weeds were growing in the fitted ground. Snap beans were planted in rows about 24 inches apart with about 1 inch between the hills in each row at a depth of about 2 inches. The moisture content of the soil was somewhat less than field capacity. Aqueous solutions containing materials in the proportion of 5 pounds per 300 gallons of material No. 1 and of the sodium salt of 2,4-D were prepared. The beans were planted before 10 a. m. in all plots and at 4 p. m. test plots were sprayed with the solutions at the rate of about 300 gallons per acre. Check plots containing beans were unsprayed. Weed counts were taken 27 days and 59 days after planting and spraying. The plots sprayed with material No. 1 showed a total of 8 and 19 weeds in six random areas, 6 x 6 inches, at the respective counting dates; those sprayed with the 2,4-D salt showed a total of 43 and 65 weeds, respectively, in six random, 6 x 6", areas; and the check plots showed a total of about 72 weeds in six random, 6 x 6", areas, at both counts. The weeds were principally crab grass, purslane and carpet weed. In the treated plots the stands of beans appeared to be the same as in the check plots. When weed counts were made at 27 and 59 days after treatment, no effects of the chemicals on the bean plants were noted.

In a test for the weeding of corn, the land was fitted and no weeds were growing in the fitted field. Eighteen plots, 10 x 10 feet, were used in the test, six being check plots and the remaining plots being used to receive sprays of chemical No. 1 and of the sodium salt of 2,4-D at the rates of 1, 3, and 5 pounds of the herbicides per acre, each spray being applied to two plots. The spray solutions contained the herbicides at the rates of 1, 3, and 5 pounds dissolved in 300 gallons of water and were applied to the plots at the rates of 300 gallons per acre. Corn was planted in the morning and the solutions applied about six hours later. Weed counts were made 17 days later by counting the weeds in nine random, 6 x 6", areas in each plot. The weed counts shown in the following Table 3 are the totals of the weeds in the nine random areas for each plot. The test and check plots were randomized. The corn was planted in rows about 30 inches apart with about 5 inches between each hill in each row. All of the corn planted was growing and healthy when the weed counts were taken.

*Table 3*

| Pounds Per Acre | Plots | No. of Weeds | | | Average | | | Per Cent of Check | | |
|---|---|---|---|---|---|---|---|---|---|---|
| | | 1# | 3# | 5# | 1# | 3# | 5# | 1# | 3# | 5# |
| Chemical No. 1 | a | 69 | 13 | 29 | 57.0 | 19.5 | 20.0 | 41.8 | 14.3 | 14.6 |
| | b | 45 | 26 | 11 | | | | | | |
| Na salt of 2,4-D | a | 52 | 24 | 4 | 36.5 | 30.0 | 7.5 | 26.7 | 22.0 | 5.5 |
| | b | 21 | 36 | 11 | | | | | | |
| Checks | a | | | 112 | | | 136.6 | | | |
| | b | | | 146 | | | | | | |
| | c | | | 96 | | | | | | |
| | d | | | 87 | | | | | | |
| | e | | | 145 | | | | | | |
| | f | | | 234 | | | | | | |

The materials disclosed herein may be prepared in the following manner.

Example 1

Sodium 2-(2,4-dichlorophenoxy)ethyl sulfate was prepared by adding 1 gram mole of 2-(2,4-dichlorophenoxy)ethanol to a mixture of 1.25 moles of ethyl ether and 1.15 moles of chlorosulfonic acid at −10° C. to 0° C. The mixture was stirred for two hours at this temperature and then slowly added to 600 cc. of a 15% water solution of NaOH (2.25 moles of NaOH) at 25° C. The ethyl ether was removed by distillation, the residue allowed to cool to room temperature and the solid sodium 2-(2,4-dichlorophenoxy)ethyl sulfate which separated was filtered off and dried. The filtrate was a water solution containing the residues and by-products of the reaction, that is a little NaOH, and the sodium sulfate and sodium chloride which were formed. The organic sulfate is substantially insoluble in the aqueous solution of the inorganic materials at a temperature below 30° C. The product obtained by filtration melted at 170° C., was a white crystalline solid and analyzed 98% sodium 2-(2,4-dichlorophenoxy)ethyl sulfate. The process operated at an efficiency better than 95%.

With reference to variations in the process previously given, as applied to the sulfates referred to herein, the alcohol may be added to the sulfonic acid-ether mixture at from −20° C. to 60° C. If the reaction is conducted above 40° C. dehydration commences and the sulfonic acid adds to the olefin which is formed. In the step of neutralization of the aryloxy alkyl sulfate, it is preferred to maintain the temperature between 20° C. and 30° C. but the neutralization may be effected at a temperature between 0° C. and 50° C. and if the reaction medium is maintained in an alkaline condition, preferably at a pH above 8, the temperature may be above 50° C. The ethyl ether may be replaced in whole or in part by another suitable solvent, for instance isopropyl, butyl or halogenated ethyl ethers or the like. The organic sulfates disclosed herein are all soluble in water at least to the extent of 5 pounds per 100 gallons of water.

The materials were used for the biological tests after preparation in the manner stated, that is without purification, as purification adds to the cost of the product and it was desired to discover low cost operative materials. In preparing the materials, substantially stoichiometric amounts of reactants were used so that relatively small amounts of unreacted materials remained. For the biological tests, the amounts of materials used were the weights given, allowance being made for the presence of water in the cases where the products were obtained as solutions but no allowance being made for other impurities.

Example 2

Sodium 2-(2,4,5-trichlorophenoxy)ethyl sulfate, a white crystalline solid melting at 242° C., was prepared in the manner stated in Example 1, using 1 mole of 2,4,5-trichlorophenoxy ethanol instead of the dichlorophenoxy ethanol of Example 1.

Example 3

Sodium 2-(4-chlorophenoxy)ethyl sulfate, melting at 132°–134° C., was prepared in the manner stated in Example 1, using 1 mole of 4-chlorophenoxy ethanol instead of the dichlorophenoxy ethanol of Example 1.

Example 4

Morpholine 2-(2,4-dichlorophenoxy)ethyl sulfate, a white crystalline solid melting at 102° C., was prepared in the manner stated in Example 1, using 2.25 moles of morpholine in 600 cc. of water instead of the aqueous NaOH of Example 1.

Example 5

Ammonium 2-(2,4-dichlorophenoxy)ethyl sulfate, a white crystalline solid which decomposes at 90° C.–95° C., was prepared in the manner stated in Example 1, using 2.25 moles of $NH_3$ in 600 cc. of water instead of the aqueous NaOH of Example 1.

Example 6

Disodium 2-(2,4-dichlorophenoxy)ethyl phosphate was prepared by first heating a mixture of 3 gram moles of phosphorus oxychloride and 1 mole of 2-(2,4-dichlorophenoxy)ethanol at 105° C. for ten hours. The 2-(2,4-dichlorophenoxy)-ethyl dichlorophosphate which formed, distilled at 155° C. at 4 mm. and had a specific gravity of 1.446 20°/20°. To a solution of 10 grams of sodium hydroxide (¼ mole) in 400 cc. of 90% ethanol, 67 grams of the 2-(2,4-dichlorophenoxy)ethyl dichlorophosphate were added. The mixture was heated at 80° C. for two hours. The ethanol and water were removed by distillation and the product, disodium 2-(2,4-dichlorophenoxy)ethyl phosphate, solidified, having a melting point above 250° C.

Example 7

Sodium 2-(2-(2,4-dichlorophenoxy)ethoxy)ethyl sulfate was prepared in the manner stated in Example 1, using 1 mole of the mono-(2,4-dichlorophenyl) ether of diethylene glycol instead of the dichlorophenoxy ethanol of Example 1. The product was isolated as a 40% water solution. The said ether was prepared by adding 1 mole of diglycol chlorohydrin to a mixture of 1 mole of sodium hydroxide, 1 mole of 2,4-dichlorophenol and 500 cc. of water at 50° C. After the addition, the mixture was heated at 90° C. for one hour. On cooling to room temperature, the mixture separated into two layers and the organic material was separated from the salt solution and distilled.

Example 8

Calcium 2-(2,4-dichlorophenoxy)ethyl sulfate was prepared in the manner stated in Example 1, using 1.25 gram moles of finely-divided $Ca(OH)_2$ slurried in 600 cc. of water instead of the aqueous NaOH of Example 1. The white, crystalline product melts with decomposition at 225° C.

Example 9

Triethanolamine 2-(2,4-dichlorophenoxy)ethyl sulfate, a white crystalline solid which melts at 165° C., was prepared in the manner stated in Example 1, using 2.25 gram moles of triethanolamine in 600 cc. of water instead of the aqueous NaOH of Example 1.

Example 10

Sodium 2-(2,4-dibromophenoxy)ethyl sulfate was prepared in the manner stated in Example 1, using 1 gram mole of 2,4-dibromophenoxy ethanol instead of the dichlorophenoxy ethanol of Example 1. Sodium 2-(2,4-dibromophenoxy)ethyl sulfate is a white crystalline solid melting at 79°–82° C.

Examples 11-21

The materials listed in Table 1 under Numbers 11 to 21, inclusive, were prepared in the manner stated in Example 1, using, instead of 2,4-dichlorophenoxy ethanol, 1 gram mole of the appropriate alcohol reactant.

*Example 11.*—In the preparation of No. 11, the alcohol was 2-chloro-4-dodecyl-2-(phenoxy) ethanol. The product was recovered as a 70% water solution (parts by weight).

*Example 12.*—In the preparation of No. 12, the alcohol was 4-chloro-3,5-dimethylphenoxy ethanol. The product was a white crystalline solid which melts at 135° C.

*Example 13.*—In the preparation of No. 13, the alcohol was 1-(2,4-dichlorophenoxy)-2-propanol. The product was a white crystalline solid melting at 165°-170° C. The propanol was prepared by adding 1 mole of propylene chlorohydrin to a mixture of 1 mole of 2,4-dichlorophenol, 1 mole of sodium hydroxide and 500 cc. of water at 50° C., then heating for one hour at 90° C., then cooling, separating and distilling as stated in Example 7.

*Example 14.*—In the preparation of No. 14, the alcohol was 2-(2-chlorophenoxy) ethanol. The product was a white, crystalline solid, melting at 210° C.

*Example 15.*—In the preparation of No. 15, the alcohol was 2-(phenoxy) ethanol. The product was a white, crystalline solid, melting at 135°-140° C.

*Example 16.*—In the preparation of No. 16, the alcohol was 2-(cresoxy) ethanol. The product was a white, crystalline solid, melting at 120° C.

*Example 17.*—In the preparation of No. 17, the alcohol was p,p'-isopropylidene-bis-2-(2,6-dichlorophenoxy) ethanol. The product was a white, crystalline solid, melting above 250° C.

*Example 18.*—In the preparation of No. 18, the alcohol was 2-(alpha,naphthoxy)ethanol. The product was a white, crystalline solid, melting above 250° C.

*Example 19.*—In the preparation of No. 19, the alcohol was 2-(pentachlorophenoxy)ethanol. The product was a white, crystalline solid, melting at 100° C.

*Example 20.*—In the preparation of No. 20, the alcohol was 2-(2,4,6-trichlorophenoxy)ethanol. The product was a white, crystalline solid, melting at 100° C.

*Example 21.*—In the preparation of No. 21, the 1 mole of the substituted ethanol of Example 1 was replaced by 1 mole of bis-1,1'-(2-hydroxyethoxy)-4,4'diphenyl sulfone; and 2.50 moles of ethyl ether and 2.15 moles of chlorosulfonic acid were used. In the neutralization step 4.25 moles of NaOH in 1200 cc. of water were used. The product was a white crystalline solid melting from 190° to 200° C. The sulfone was prepared by adding 2 moles of ethylene chlorohydrin to a mixture of 1 mole of 1,1'-dihydroxyphenyl sulfone, 2 moles of NaOH and 500 cc. of water at 50° C. and then heating for one hour at 90° C. On cooling, the solid hydroxyethyl sulfone which separated was filtered off and washed with water. This intermediate product is a white crystalline solid which melts at 175° C.

Although the materials disclosed herein may be applied to the earth without dilution, the use of a carrier facilitates the even distribution of the small amounts of materials which are required. Water is the preferred extender as it is absorbed by earth and carries the active materials into the soil. Any amount of water may, in general, be used although where the earth is at field capacity it is preferred to use concentrated solutions so that the water in the earth at the time of spraying does not draw the herbicides more than one-half inch below the surface and where the earth is quite wet a lesser amount of the toxicant may be used. Where the earth is relatively dry a larger amount of the toxicant is preferred per acre and also a larger amount of water so that the active material is taken into the earth. In the tests described herein, solutions were used at the rate of 300 gallons per acre as a means of very accurately and evenly distributing the toxicants. A farmer usually wants to spray no more than 100 gallons of water per acre and prefers to spray less gallonage, as the less the gallonage the fewer trips he has to make from the fields to the water supply. The materials disclosed herein may be sprayed with good results at substantially any concentration the farmer desires consistent with even covering of the field which will, in the majority of instances, be determined by the efficiency of the spraying apparatus with respect to even distribution of the spray.

If desired, the herbicides may be applied as dusts. The usual rate of application of dusts is from 30 to 50 pounds per acre, this also being determined in large measure by the particular apparatus which the farmer uses. For dusting, the dusts should include sufficient of the herbicides to give the heretofore-stated amounts of toxicant per acre, the remainder of the 30 to 50 pounds of dust being any of the usual inert carriers, or even earth. As a part of the 30 to 50 pounds of dust, any other desired toxicant, for instance arsenate of lead, may be included. Amounts of dust less than 30 pounds per acre may be used, the proportion of herbicide being correspondingly increased. But even sprays or dusts carrying high concentrations of the herbicides disclosed herein are safe to use on fields next to fields of sensitive plants in foliage as, when properly applied, they have high toxicant effects against shallow germinating seeds and seedlings but low toxicant effects against plants when in contact with foliage.

Apart from the distinctive herbicidal properties of certain of the materials herein disclosed, adapting them to agricultural uses, the materials generally may be used as modifying agents in the textile and paper industries, and as water softeners and they may find applications in the pharmaceutical arts either as drugs or intermediates.

I claim:

1. An alkali metal salt of 2-(2,4-dichlorophenoxy)ethyl sulfate.

2. An amine salt of 2-(2,4-dichlorophenoxy) ethyl sulfate.

3. A material of the formula

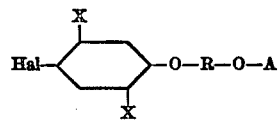

in which "Hal" is a member of the group consisting of chlorine and bromine, "X" is a member of the group consisting of hydrogen, chlorine and bromine, "R" is a member of the group consisting of —CH₂CH₂— and

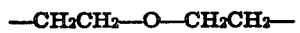

and "A" is the completely neutralized residue of a member of the group consisting of sulfuric acid and phosphoric acid and contains a member of the group consisting of an amine, Na, K, Ca, Ba, Mg and $NH_4$.

4. A herbicidal composition containing a material of the formula of claim 3 and a carrier.

5. A herbicidal composition containing a material of the formula of claim 3 and water.

6. A herbicidal composition containing a material of the formula of claim 3 and a powder.

7. Method of preventing the germination of seeds which comprises applying to earth containing the seeds, a material of the formula of claim 3.

8. Method of preventing the germination of seeds which comprises applying to the earth containing the seeds, a material of the formula of claim 3 at the rate of from 0.5 to 5 pounds per acre.

9. Method of preventing the germination of seeds which comprises applying to the earth containing the seeds a composition comprising a carrier and a material of the formula of claim 3.

10. An alkaline earth metal salt of 2-(2,4-dichlorophenoxy)ethyl sulfate.

JOSEPH A. LAMBRECH.

REFERENCES CITED

The following references are of record in the file of this patent:

UNITED STATES PATENTS

| Number | Name | Date |
|---|---|---|
| 2,143,759 | Bruson et al. | Jan. 10, 1939 |
| 2,213,477 | Steindorff et al. | Sept. 3, 1940 |

OTHER REFERENCES

"Chemical Abstracts," vol. 41 (1947), column 3904h (complete abstract runs from column 3902 to 3912).